United States Patent
Imai et al.

(10) Patent No.: US 6,589,659 B1
(45) Date of Patent: Jul. 8, 2003

(54) SHEET COATED WITH SILICONE COMPOUNDS HIGHLY EFFECTIVE IN PREVENTING ADHESION OF STAINS AND PROCESS FOR PREPARING THE SAME

(75) Inventors: Shigeo Imai, Kagawa (JP); Hiroshi Tsuboi, Kagawa (JP)

(73) Assignee: Uni-Charm Corporation, Kawanoe (JP)

( * ) Notice: Subject to any disclaimer, the term of this patent is extended or adjusted under 35 U.S.C. 154(b) by 0 days.

(21) Appl. No.: 09/533,951

(22) Filed: Mar. 23, 2000

(30) Foreign Application Priority Data

Mar. 29, 1999 (JP) ............................................. 11-085916

(51) Int. Cl.$^7$ .............................. B32B 9/04; C08L 83/04

(52) U.S. Cl. ........................ 428/447; 428/448; 428/451; 428/452; 525/477; 427/387; 427/515; 427/356; 427/421; 427/428

(58) Field of Search ................................ 428/447, 420, 428/448, 451, 452; 427/387, 515, 356, 421, 428; 525/477

(56) References Cited

U.S. PATENT DOCUMENTS

| | | | | |
|---|---|---|---|---|
| 4,844,986 A | * | 7/1989 | Karakelle et al. | ........... 428/447 |
| 5,645,939 A | * | 7/1997 | Yoneda et al. | |
| 6,150,020 A | * | 11/2000 | Dharmadhikary | |
| 6,153,304 A | * | 11/2000 | Smith et al. | |

FOREIGN PATENT DOCUMENTS

JP    S60-194183    10/1985

* cited by examiner

Primary Examiner—Robert Dawson
Assistant Examiner—Marc S Zimmer
(74) Attorney, Agent, or Firm—Darby & Darby

(57) ABSTRACT

There is disclosed a sheet coated with a first silicone compound having a certain surface tension and a second silicone compound having a lower surface tension than the first silicone compound so that only the second silicone compound appears on the sheet surface or the second silicone compound appears on the sheet surface more than the first silicone compound. The sheet thus coated with the silicone compounds are highly water-repellent and highly effective in preventing adhesion of protein-containing stains. Moreover, it is highly resistant to friction so that the above effects can be maintained for a long period of time.

39 Claims, No Drawings

SHEET COATED WITH SILICONE COMPOUNDS HIGHLY EFFECTIVE IN PREVENTING ADHESION OF STAINS AND PROCESS FOR PREPARING THE SAME

BACKGROUND OF THE INVENTION

1. Field of the Invention

The present invention relates to a sheet that is coated with silicone compounds in order to heighten the effect of preventing adhesion of stains and a process for preparing the sheet. More particularly, the invention relates to a sheet highly effective in preventing adhesion of stains which has a multi-layer construction coated with silicone compounds different in surface tension and a process for preparing the sheet.

2. Description of the Related Art

In recent years, there are a variety of sheets formed of fabric, non-woven fabric, or resin sheets that have undergone a water-repelling treatment. Examples of such sheets include raincoats, bibs for babies and infants, aprons, lunch mats, tablecloths, boots, underwear, and back sheets of sanitary goods such as diapers and sanitary napkins. This treatment is carried out to prevent adhesion of stains, to allow stains to wash out easily even though the sheets are stained, or to prevent water or stains from oozing through the sheets.

For the water-repelling treatment, sheets are coated, for example, with rubber, resins, or silicone oil. For example, Japanese Patent Laid-Open No. 194183/1985 discloses cloth where a fiber construction treated with a silicone type water repellent is coated with film formed of silicone rubber. However, this cloth can not prevent adhesion (sticking) of stains effectively even though it can repel water.

In order to prevent adhesion (sticking) of stains, sheets need still higher water repellency. For example, blood is a liquid that contains water as solvent. The surface tension of the water is about 73.0 mN/m in its standard condition and on the other hand, the surface tension of the blood is about 54.0 mN/m. Accordingly, for preventing adhesion of stains such as blood, the sheets require still higher water repellency. In addition, for blood or a protein-containing liquid to be scattered at meals, it is irrational to evaluate its adhesion only by surface tension. For example, albumin and globulin in blood and various proteins contained in a liquid to be scattered at meals have a three-dimensional structure and in addition, have various groups such as amino groups and carboxyl groups. Consequently, protein-containing stains exhibit very high adhesion as compared with water molecules having a strong tendency to cohere to themselves, caused by hydrogen bonds. Therefore, the development of sheets that have still higher water repellency and are highly effective of preventing adhesion of stains has been in demand.

In addition, conventional water repellents having low resistance to friction have a disadvantage of deteriorating in water repellency due to flaking off or producing cracks on the surface by the use in a short period of time. For improvement in anchoring effect to base materials, modification of the molecular structures of the water repellents themselves or addition of an anchoring agent (such as hot melt adhesive, urethane curing agent or the like) to the water repellents is carried out. However, practice of these methods results in deterioration in water repellency of the repellents.

SUMMARY OF THE INVENTION

The present invention is to solve the problems described above and has an object to provide a sheet having high water repellency that can prevents adhesion of protein-containing stains.

Another object of the invention is to provide a sheet that can maintain high water repellency and high effectiveness in preventing adhesion of stains in spite of friction working on its surface.

According to a first aspect of the invention, there is provided a sheet highly effective in preventing adhesion of stains, which comprises a base sheet, a first silicone compound layer formed on the surface of the base sheet, and a second silicone compound layer further formed on the surface of the first silicone compound layer, the second silicone compound layer having a lower surface tension than the first silicone compound layer. A process for preparing this sheet comprises the steps of forming a primary coat of the first silicone compound (i.e., the first silicone compound layer) on the surface of the base sheet; curing the primary coat; and forming a surface coat of the second silicone compound (i.e., the second silicone compound layer) having a lower surface tension than the first silicone compound on the surface of the primary coat.

According to a second aspect of the invention, there is provided a sheet highly effective in preventing adhesion of stains, which comprises a base sheet and a layer formed on the surface of the base sheet, wherein the layer comprises a mixture of a first silicone compound and a second silicone compound having a lower surface tension than the first silicone compound, and the second silicone compound appears on the surface of the layer more than the first silicone compound. A process for preparing this sheet comprises the steps of: forming a coat of a mixture of the first silicone compound and the second silicone compound having a lower surface tension than the first silicone compound on the base sheet; and crosslinking the silicone compounds in a condition where the second silicone compound is transferred to the surface side of the coat and first silicone compound is transferred to the base sheet side of the coat. Alternatively, the sheet may be prepared by a process comprising the steps of: forming a coat of a mixture of the first silicone compound and the second silicone compound having a lower surface tension than the first silicone compound on the base sheet; and crosslinking the silicone compounds so that the second silicone compound appears on the surface of the coat more than the first silicone compound by bleeding.

These sheets of the invention are coated with silicone on the surfaces and therefore, exhibit high water repellency. Moreover, they can prevent to a great extent the adhesion of protein-containing stains. In these sheets, still moreover, friction of the surfaces coated with the silicones does not cause deterioration in these effects.

The term "surface tension" as used for the silicone compounds in the invention means a surface tension of silicone compound in a liquid state. However, even after the silicone compounds are fixed (or solidified), it is preferable that the surface tension of the first silicone compound is higher than the surface tension of the second silicone compound.

DETAILED DESCRIPTION OF THE INVENTION

In accordance with the invention, the presence of the first silicone compound having a certain surface tension on the base sheet side and the presence of the second silicone compound having a lower surface tension than the first silicone compound on the surface side result in heightening the effect of preventing the adhesion of stains. The sheets of the invention that are highly effective in preventing the adhesion of stains can be prepared by any one of the following three methods.

(1) A method where the first silicone compound is applied to the surface of a base sheet and then crosslinked to form a primary coat (layer) and after fixing the primary coat, the second silicone compound having a lower surface tension than the first silicone compound is applied to the surface of the primary coat to form a surface coat (layer).

(2) A method where a mixture of the first silicone compound and the second silicone compound having a lower surface tension than the first silicone compound is applied to the surface of a base sheet to form a coat (layer) and the silicone compounds are crosslinked in a condition where the second silicone compound is transferred to the surface side of the coat and the first silicone compound is transferred to the base sheet side of the coat.

(3) A method where a mixture of the first silicone compound and the second silicone compound having a lower surface tension than the first silicone compound is applied to the surface of a base sheet to form a coat (layer) and after crosslinking, the major portion of the second silicone compound is allowed to come to the surface of the coat by bleeding.

In method (1), the first silicone compound is applied and fixed to the base sheet and subsequently, the second silicone compound is applied to form a double-layer construction. Accordingly, either of a reactive polymer and a non-reactive compound can be used as the first and the second silicone compounds.

In methods (2) and (3), it is preferred that a reactive polymer is used as the first silicone compound and a non-reactive compound is used as the second silicone compound. In method (2), when the mixture of the first silicone compound and the second silicone compound is allowed to stand for a while in a condition where the mixture has been coated on the base sheet, the first silicone compound is transferred to the base sheet side of the coat and the second silicone compound is bled to the surface side of the coat. In this condition, crosslinking is carried out to fix the silicones on the base sheet.

In method (3), immediately after the mixture of the first and the second silicone compounds is applied to the base sheet, a crosslinking treatment such as heating is carried out. The second silicone compound undergoes bleeding to the surface side of the coat by this treatment. This phenomenon seems to occur because the surface tension of the second silicone compound formed of the non-reactive compound is lower than that of the first silicone compound. In the sheet of the invention prepared by method (3), the amount of the second silicone compound gradually increases toward the layer's surface away from the base sheet.

The first silicone compound is illustrated below.

In order to heighten the effect of preventing the adhesion of stains in combination with the second silicone compound, the first silicone compound preferably has a surface tension of 30.0 mN/m or less. In the invention, the surface tensions were determined at standard conditions (atmospheric temperature of 20° C.).

The first silicone compound is preferably reactive silicone oil containing siloxane structure as a fundamental skeleton. For example, the compound is preferably at least one compound selected from the group consisting of methylhydrogensilicone oil, polydimethylsiloxanediol, epoxy-modified silicone oil, carboxyl-modified silicone oil, methacryl-modified silicone oil, alcohol-modified silicone oil, mercapto-modified silicone oil, vinyl-modified silicone oil, and amino-modified silicone oil. These compounds can be fixed on the base sheet by subjecting them to a process of drying, heating or the like, after coating.

In method (1), the silicone compound can also be used as the first compound. It is preferred that the silicone compound is a compound that is preferably at least one compound selected from the group consisting of dimethylsilicone oil, methylphenylsilicone oil, alkyl-based silicone oil, aralkyl-based silicone oil, polyether-modified silicone oil, fluroalkyl-modified silicone oil, and aliphatic ester-modified silicone oil.

In method (1), in addition, examples of the first silicone compound may include polysiloxane; silicone varnish such as silicone alkyd varnish, silicone epoxy varnish, silicone polyester varnish, silicone acryl varnish, silicone phenol varnish, silicone urethane varnish, and silicone melamine varnish; and silicone rubber such as dimethylsilicone rubber, methylvinylsilicone rubber, methylphenylvinyl-silicone rubber, and methylfluoroalkylsilicone rubber.

The second silicone compound is illustrated below.

The surface tension of the second silicone compound is lower than that of the first silicone compound. The surface tension of the second silicone compound is preferably at least 5.0 mN/m lower than that of the first silicone compound. When the first silicone compound having a surface tension of 30.0 mN/m or less is used, the surface tension of the second silicone compound is preferably 21.0 mN/m or less.

In method (1), the second silicon compound is preferably at least one compound selected from the group consisting of dimethylsilicone oil, methylphenylsilicone oil, methylhydrogensilicone oil, polydimethylsiloxanediol, alkyl-based silicone oil, aralkyl-based silicone oil, polyether-modified silicone oil, fluoroalkyl-modified silicone oil, aliphatic ester-modified silicone oil, amino-modified silicone oil, epoxy-modified silicone oil, carboxyl-modified silicone oil, methacryl-modified silicone oil, alcohol-modified silicone oil, mercapto-modified silicone oil, and vinyl-modified silicone oil. Preferably, the second compound is a silicone oil.

In methods (2) and (3), the second compound is preferably a silicone compound that is, for example, at least one compound selected from the group consisting of polysiloxane, silicone alkyd varnish, silicone acryl varnish, silicone phenol varnish, silicone urethane varnish, silicone melamine varnish, and dimethylsilicone rubber.

In the invention, any material can be used as the base sheet to be coated with the silicone compounds. For example, the base sheet is formed of at least one compound selected from the group consisting of: cellulose compounds such as cupra, rayon, and acetate; polyamide compounds such as nylon 6, nylon 66, and aromatic nylon; polyvinyl alcohol compounds such as Vinylon; polyvinylidene chloride compounds such as vinylidene; polyvinyl chloride compounds such as polyvinyl chloride; polyester compounds such as polyethylene terephthalate, and polyacrylate; polyacrylonitrile compounds such as acryl; polyethylene compounds such as low-density polyethylene, high-density polyethylene, and linear low-density polyethylene; polypropylene compounds such as polypropylene; polyurethane compounds such as polyurethane; and polyalkylene p-oxybenzoate compounds such as benzoate. The compound is directly formed into a resin sheet or net as the base sheet, or is formed into chemical fibers from which a sheet, net, nonwoven fabric, or cloth (textile, knitted goods) is prepared as the base sheet. Such sheet, net, nonwoven fabric, and cloth (textile, knitted goods) may also be formed from natural fibers (cotton, linen, silk, and pulp), or from a mixture of the aforementioned chemical fibers and the natural fibers.

For forming the base sheet, however, it is preferred to not use substances inhibiting crosslinking of the silicone compounds coated. It is also preferred to not use resins producing denaturation in the silicone compounds coated. Moreover, it is preferred that base sheet does not contain additives such as antioxidants, plasticizers, UV absorbers, and pigments which may cause denaturation in the silicone compounds coated.

The base sheet preferably has high wettability for uniform and thin coating with the silicone compounds. In order to improve the wettability, a base sheet formed of polyethylene film or the like can undergo corona discharge treatment prior to coating with the silicone compounds.

In the invention, coating of the base sheet with the first silicone compound, the second silicone compound, or the mixture of the first and the second silicone compounds can be carried out by use of an air doctor coater, a blade coater, a rod coater, a knife coater, a squeeze coater, an impregnating coater, a reverse-roll coater, a transfer roller coater, a gravure coater, a kiss-roll coater, a cast coater, a spray coater, a curtain coater (flood coater), a calender coater, an extrusion coater or the like.

In method (1), in order to obtain excellent effectiveness in preventing the adhesion of stains, the primary coat formed of the first silicone compound preferably has a thickness of at least 0. $\mu$m or more (more preferably, a thickness of 0.3 $\mu$m or more). The surface coat formed of the second silicone compound preferably has a thickness of at least 0. $\mu$m or more (more preferably, a thickness of 0.2 $\mu$m or more). In methods (2) and (3), the respective silicone compounds preferably have thicknesses similar to those described above, if the compounds are clearly separated into a substantial double-layer structure.

In the invention, fixation of the first silicone compound or the mixture of the first and the second silicone compounds on the base sheet can be carried out according to crosslinking methods adopted commonly for silicone compounds. Examples of the methods include condensation crosslinking and addition crosslinking by heating, cationic polymerization and radical polymerization by UV, and radical polymerization by EB. However, contamination with crosslinking agents, initiators, terminators, and other additives may result in marring the effectiveness of preventing the adhesion of stains. It is preferred, therefore, that the amounts of such substances added be as small as possible.

The sheet coated with the silicone compounds of the invention can be used for various purposes such as raincoats, bibs for babies and infants, aprons, lunch mats, tablecloths, boots, underwear, back sheets of sanitary goods such as diapers and sanitary napkins. Particularly, the sheet is useful for goods having high possibility that protein-containing stains may adhere.

The invention will be illustrated in more detail with reference to the following examples, but these are not to be construed as limiting the invention.

EXAMPLE A

Polyethylene film (23 g/m$^2$) having a surface tension of 31.0 mN/m was subjected to corona discharge treatment to improve the wettability of the surface of the film and used as a base sheet. A radical-polymerizable UV-crosslinkable silicone having a surface tension of 24.9 mN/m was used as the first silicone compound. After adding 2.0 percent by weight of a polymerization initiator to the silicone, the mixture was diluted with isopropyl alcohol (Abbreviated as IPA). The dilution ratio of IPA to the silicone was 3:1. The resulting solution was coated on the surface of the base sheet by use of a bar coater so as to be 2.0 g/m$^2$ (having a thickness of 2$\mu$m). After coating, the first silicone compound on the surface of the base sheet was cured by irradiation with ultraviolet rays to form a primary coat.

As the second silicone compound, dimethylsilicone oil and methylhydrogensilicone oil were diluted in IPA for Example 1 and Example 2, respectively. The dilution ratios of IPA to the silicones each were 3:2. The respective solutions were coated by use of a bar coater so as to be 5.0 g/m$^2$ (having a thickness of 5$\mu$m) and dried at 70° C. for 5 minutes to vaporize IPA. Sheets thus prepared had a thickness of the first silicone compound layer of about 0.5 $\mu$m and a thickness of the second silicone compound layer of about 2.0 $\mu$m. The sheets of Examples 1 and 2 were subjected to the following blood repellency test.

(Blood Repellency Test)

Friction of the surfaces of the test sheets was carried out at a speed of 150 m/min by use of span lace nonwoven fabric in a condition where a load of 50 g/m$^2$ was applied to the surfaces (surfaces coated with the silicones). In this test, the sheets of the invention were supposed to be used as liquid-impermeable back sheets for sanitary napkins: the pressure applied to a hip of a person having an about 60-kg weight was assumed to be 50 g/m$^2$ and the speed at which both legs move forward and backward at a slightly quick pace was assumed to be 150 m/min. The frequencies of friction are shown in Table 1. The test sheets that had undergone friction were cut into 9 mm×110 mm and 0.2 ml portions of simulated blood were dropped on their surfaces (surfaces coated with the silicones). As the simulated blood, use was made of an aqueous solution, which contained albumin (the protein that is present in the largest amount among proteins in serum) and was adjusted to have a surface tension of about 54.0 mN/m. Subsequently, the sheets were inclined at a speed of 2°/sec and weighed after the simulated blood flowed out from the sheets. The amounts of adherent simulated blood were found by subtracting the weight of the sheets prior to dropping of the simulated blood (i.e., the former weight) from the weight of the sheets from which the simulated blood flowed out (i.e., the later weight).

Sheets of Comparative Examples as described below were prepared in a manner similar to that of Example 1, using the same base sheets as that of the Example 1. The sheets of comparative examples underwent the same blood repellency test as described above.

Comparative Example 1

The base sheet with no silicone coated.

Comparative Example 2

A sheet formed by coating radical-polymerizable UV-crosslinkable silicone (thickness: 2.0 $\mu$m) on the base sheet.

Comparative Example 3

A sheet formed by coating dimethylsilicone oil (thickness: 2.0 $\mu$m) on the base sheet.

Comparative Example 4

A sheet formed by coating methylhydrogensilicone oil (thickness: 2.0 $\mu$m) on the base sheet.

Comparative Example 5

A sheet having a double-layer construction formed by coating a rubber hot melt adhesive and the dimethylsilicone oil (thickness: 2.0 $\mu$m) on the base sheet.

Comparative Example 6

A sheet having a double-layer construction formed by coating rubber hot melt adhesive and methylhydrogensilicone oil (thickness: 2.0 μm) on the base sheet.

Comparative Example 7

A sheet having a double-layer construction formed by coating an epoxy resin and dimethylsilicone oil (thickness: 2.0 μm) on the base sheet.

Comparative Example 8

A sheet having a double-layer construction formed by coating the epoxy resin and methylhydrogensilicone oil (thickness: 2.0 μm) on the base sheet.

Results are shown in Table 1.

other single-layer construction or double-layer constructions have been formed. In addition, in the sheets of the Comparative Examples, cracking or dropping off of the water repellents on the surfaces by friction results in extreme deterioration in blood repellency whereas the sheets of the invention are found to have no serious deterioration in blood repellency in spite of the friction. This shows that for example, even when the sheet of the invention is used as a top sheet of a sanitary napkin and suffers from high friction due to contact with skin through body hair, there will be caused little deterioration in blood repellency.

EXAMPLE B

Example 3

A sheet was prepared in the same manner as in Example 1 except that methylhydrogensilicone oil having a surface

TABLE 1

| Frequency of Friction Applications | 0 | 2 | 5 | 10 | 25 | 50 | 100 | 200 |
|---|---|---|---|---|---|---|---|---|
| Comparative Example 1 | | | | | | | | |
| Former Weight (g) | 0.0683 | 0.0722 | 0.0701 | 0.0844 | 0.0824 | 0.0679 | 0.09 | 0.0907 |
| Later Weight (g) | 0.0974 | 0.1116 | 0.1055 | 0.1338 | 0.1324 | 0.1138 | 0.1466 | 0.1399 |
| Amount of Adherent Stimulated Blood (g) | 0.0291 | 0.0394 | 0.0354 | 0.0494 | 0.05 | 0.0459 | 0.0566 | 0.0492 |
| Comparative Example 2 | | | | | | | | |
| Former Weight (g) | 0.1026 | 0.0749 | 0.0863 | 0.0741 | 0.0836 | 0.0809 | 0.0979 | 0.0886 |
| Later Weight (g) | 0.138 | 0.1075 | 0.1292 | 0.1137 | 0.1226 | 0.1228 | 0.148 | 0.1416 |
| Amount of Adherent Stimulated Blood (g) | 0.0354 | 0.0326 | 0.0429 | 0.0396 | 0.039 | 0.0419 | 0.0501 | 0.053 |
| Comparative Example 3 | | | | | | | | |
| Former Weight (g) | 0.0891 | 0.0605 | 0.0791 | 0.0628 | 0.0668 | 0.0723 | 0.0944 | 0.0816 |
| Later Weight (g) | 0.0889 | 0.0692 | 0.0978 | 0.0872 | 0.0914 | 0.1062 | 0.1335 | 0.1156 |
| Amount of Adherent Stimulated Blood (g) | −0.0002 | 0.0087 | 0.0187 | 0.0244 | 0.0246 | 0.0339 | 0.0391 | 0.034 |
| Comparative Example 4 | | | | | | | | |
| Former Weight (g) | 0.0822 | 0.0712 | 0.08 | 0.0768 | 0.0856 | 0.0825 | 0.0754 | 0.0843 |
| Later Weight (g) | 0.0815 | 0.0749 | 0.098 | 0.1006 | 0.1238 | 0.126 | 0.1173 | 0.1278 |
| Amount of Adherent Stimulated Blood (g) | −0.0007 | 0.0037 | 0.018 | 0.0238 | 0.0382 | 0.0435 | 0.0419 | 0.0435 |
| Comparative Example 5 | | | | | | | | |
| Former Weight (g) | 0.2946 | 0.3154 | 0.363 | 0.2969 | 0.3054 | 0.2773 | 0.2891 | 0.2665 |
| Later Weight (g) | 0.2943 | 0.3385 | 0.3921 | 0.3263 | 0.3426 | 0.3121 | 0.324 | 0.3027 |
| Amount of Adherent Stimulated Blood (g) | −0.0003 | 0.0231 | 0.0291 | 0.0294 | 0.0372 | 0.0348 | 0.0349 | 0.0362 |
| Comparative Example 6 | | | | | | | | |
| Former Weight (g) | 0.2721 | 0.2412 | 0.2786 | 0.3089 | 0.2394 | 0.2484 | 0.2537 | 0.2778 |
| Later Weight (g) | 0.2718 | 0.2709 | 0.3111 | 0.3372 | 0.2697 | 0.285 | 0.2992 | 0.32 |
| Amount of Adherent Stimulated Blood (g) | −0.0003 | 0.0297 | 0.0325 | 0.0283 | 0.0303 | 0.0366 | 0.0455 | 0.0422 |
| Comparative Example 7 | | | | | | | | |
| Former Weight (g) | 0.088 | 0.096 | 0.0847 | 0.0907 | 0.0807 | 0.0825 | 0.0809 | 0.0752 |
| Later Weight (g) | 0.0965 | 0.1142 | 0.104 | 0.1147 | 0.1097 | 0.1115 | 0.1126 | 0.1047 |
| Amount of Adherent Stimulated Blood (g) | 0.0085 | 0.0182 | 0.0193 | 0.024 | 0.029 | 0.029 | 0.0317 | 0.0295 |
| Comparative Example 8 | | | | | | | | |
| Former Weight (g) | 0.0874 | 0.0852 | 0.0794 | 0.101 | 0.0959 | 0.0852 | 0.0964 | 0.0882 |
| Later Weight (g) | 0.0892 | 0.0889 | 0.0882 | 0.1242 | 0.1185 | 0.1059 | 0.1273 | 0.1249 |
| Amount of Adherent Stimulated Blood (g) | 0.0018 | 0.0037 | 0.0088 | 0.0232 | 0.0226 | 0.0207 | 0.0309 | 0.0367 |
| Example 1 | | | | | | | | |
| Former Weight (g) | 0.0604 | 0.0622 | 0.0524 | 0.0569 | 0.0576 | 0.0706 | 0.0652 | 0.0599 |
| Later Weight (g) | 0.06 | 0.062 | 0.0523 | 0.057 | 0.0578 | 0.0743 | 0.076 | 0.0764 |
| Amount of Adherent Stimulated Blood (g) | −0.0004 | −0.0002 | −0.0001 | 0.0001 | 0.0002 | 0.0037 | 0.0108 | 0.0165 |
| Example 2 | | | | | | | | |
| Former Weight (g) | 0.0569 | 0.0554 | 0.0513 | 0.0523 | 0.0632 | 0.0647 | 0.0616 | 0.0717 |
| Later Weight (g) | 0.0565 | 0.0553 | 0.0511 | 0.0524 | 0.0635 | 0.0685 | 0.0706 | 0.0871 |
| Amount of Adherent Stimulated Blood (g) | −0.0004 | −0.0001 | −0.0002 | 0.0001 | 0.0003 | 0.0038 | 0.009 | 0.0154 |

As seen from Table 1, the sheets of the Examples 1 and 2 according to the invention have high blood repellency as compared with those of the Comparative Examples where tension of 20.0 mN/m was used in place of the dimethylsilicone oil used as the second silicone compound in Example 1.

Example 4

The radical-polymerizable UV-crosslinkable silicone as the first silicone compound, the dimethylsilicone oil as the second silicone compound, and the polymerization initiator that were used in Example 1 were mixed in a ratio of 49:50:1, applied to the base sheet similarly to Example 1, and crosslinked for 30 minutes at a temperature (70° C.), this degree of heat causing no deformation or melting of the base sheet, to prepare a sheet.

Example 5

Methylphenylsilicone oil having a surface tension of 22.0 mN/m as the first silicone compound was applied to the surface of the base sheet and crosslinked in the same manner as in Example 1 to form a primary coat. Dimethylsilicone oil having a surface tension of 19.7 mN/m as the second silicone compound was applied to the surface of the primary coat and crosslinked to prepare a sheet.

The sheets of Examples 3 to 5 also were found to have an excellent effect of preventing the adhesion of protein-containing stains.

As understood from the above results, the sheet of the invention that has a double-layer structure or double-layer-like structure of silicone compounds, is effective in preventing the adhesion of protein-containing stains. Moreover, even when friction is introduced to its silicone-coated surface in use, no serious deterioration will be caused in either the water repellency or the effect of preventing the adhesion of protein-containing stain.

The invention may be embodied in other specific forms without departing from the spirit or essential characteristics thereof The present embodiment is therefore to be considered in all aspects as illustrative and not restrictive, the scope of the invention being indicated by the appended claims rather than by the foregoing description and all changes which come within the meaning and range of equivalency of the claims are therefore intended to be embraced therein.

What is claimed is:

1. A sheet highly effective in preventing adhesion of stains, comprising:
    a base sheet,
    a first silicone compound layer formed on a surface of the base sheet, and
    a second silicone compound layer formed on a surface of the first silicone compound layer, the second silicone compound having a lower surface tension than the first silicone compound;
    wherein the first silicone compound is at least one silicone oil selected from the group consisting of dimethylsilicone oil, methylphenylsilicone oil, alkyl-based silicone oil, aralkyl-based silicone oil, polyether-modified silicone oil, fluoroalkyl-modified silicone oil, and aliphatic ester-modified silicone oil.

2. The sheet as described in claim 1 wherein the surface tension of the first silicone compound is 30.0 mN/m or less.

3. The sheet as described in claim 2 wherein the first silicone compound layer has a thickness of 0.1 μm or more.

4. The sheet as described in claim 2 wherein the second silicone compound layer has a thickness of 0.1 μm or more.

5. The sheet as described in claim 2 wherein the second silicone compound is at least one silicone oil selected from the group consisting of dimethylsilicone oil, methylphenylsilicone oil, methylhydrogensilicone oil, polydimethylsiloxanediol, alkyl-based silicone oil, aralkyl-based silicone oil, polyether-modified silicone oil, fluoroalkyl-modified silicone oil, aliphatic ester-modified silicone oil, amino-modified silicone oil, epoxy-modified silicone oil, carboxyl-modified silicone oil, methacryl-modified silicone oil, alcohol-modified silicone oil, mercapto-modified silicone oil, and vinyl-modified silicone oil.

6. The sheet as described in claim 2 wherein the base sheet is made of at least one compound selected from the group consisting of cellulose compounds, polyamide compounds, polyvinyl alcohol compounds, polyvinylidene chloride compounds, polyvinyl chloride compounds, polyester compounds, polyacrylonitrile compounds, polyethylene compounds, polypropylene compounds, polyurethane compounds, and polyalkylene p-oxybenzoate compounds.

7. A process for preparing the sheet as described in claim 1, comprising the steps of: forming a primary coat of the first silicone compound on the surface of the base sheet; curing the primary coat; and forming a surface coat of the second silicone compound having a lower surface tension than the first silicone compound on the surface of the primary coat.

8. The process as described in claim 7 wherein fixation of the first silicone compound on the base sheet is carried out through one of the following methods: condensation crosslinking by heating; addition crosslinking by heating; cationic polymerization by irradiation with ultraviolet rays; radical polymerization by irradiation with ultraviolet rays; and radical polymerization by irradiation with electron beams.

9. The process as described in claim 7 wherein formation of the coat of the silicone compound is carried out by use of one of an air doctor coater, a blade coater, a rod coater, a knife coater, a squeeze coater, an impregnating coater, a reverse roll coater, a transfer roller coater, a gravure coater, a kiss-roll coater, a cast coater, a spray coater, a curtain coater, a calendar coater, and an extrusion coater.

10. A sheet highly effective in preventing adhesion of stains, comprising:
    a base sheet; and
    a layer formed on a surface of the base sheet,
    wherein the layer comprises a mixture of a first silicone compound having a surface tension of 30.0 mN/m or less, and a second silicone compound having a lower surface tension than the first silicone compound, and the second silicone compound appears on a surface of the layer in an amount which is greater than the first silicone compound by way of bleeding; and
    wherein the first silicone compound is at least one silicone oil selected from the group consisting of methylhydrogensilicone oil, polydimethylsiloxanediol, epoxy-modified silicone oil, carboxyl-modified silicone oil, methacryl-modified silicone oil, alcohol-modified silicone oil, mercapto-modified silicone oil, vinyl-modified silicone oil, and amino modified silicone oil.

11. A sheet highly effective in preventing adhesion of stains, comprising:
    a base sheet; and
    a layer formed on a surface of the base sheet,
    wherein the layer comprises a mixture of a first silicone compound having a surface tension of 30.0 mN/m or less, and a second silicone compound having a lower surface tension than the first silicone compound, and the second silicone compound appears on a surface of the layer in an amount which is greater than the first silicone compound by way of bleeding; and
    wherein the second silicone compound is at least one silicone compound selected from the group consisting of polysiloxane, silicone alkyd varnish, silicone acryl varnish, silicone phenol varnish, silicone urethane varnish, silicone melamine varnish, and dimethylsilicone rubber.

12. A sheet highly effective in preventing adhesion of stains, comprising:
a base sheet made from at least one compound selected from the group consisting of cellulose compounds, polyamide compounds, polyvinyl alcohol compounds, polyvinylidene chloride compounds, polyvinyl chloride compounds, polyester compounds, polyacrylonitrile compounds, polyethylene compounds, polypropylene compounds, polyurethane compounds, and polyalkylene p-oxybenzoate compounds; and
a layer formed on a surface of the base sheet;
wherein the layer comprises a mixture of a first silicone compound having a surface tension of 30.0 mN/m or less, and a second silicone compound having a lower surface tension than the first silicone compound, and the second silicone compound appears on a surface of the layer in an amount which is greater than the first silicone compound byway of bleeding.

13. A process for preparing a sheet highly effective in preventing adhesion of stains, comprising a base sheet and a layer formed on a surface of the base sheet, said layer comprising a mixture of a first silicone compound and a second silicone compound having a lower surface tension than the first silicone compound, said second silicone compound appearing on a surface of the layer in an amount which is greater than the first silicone compound by way of bleeding, comprising the steps of:
forming a coat of a mixture of the first silicone compound and the second silicone compound having a lower surface tension than the first silicone compound on the base sheet; and crosslinking the silicone compounds in a condition where the second silicone compound is bled to the surface side of the coat and the first silicone compound is bled to the base sheet side of the coat.

14. The process as described in claim 13 wherein formation of the coat of the mixture of the first and the second silicone compounds is carried out by use of one of an air doctor coater, a blade coater, a rod coater, a knife coater, a squeeze coater, an impregnating coater, a reverse-roll coater, a transfer roller coater, a gravure coater, a kiss-roll coater, a cast coater, a spray coater, a curtain coater, a calendar coater, and an extrusion coater.

15. A process for preparing a sheet highly effective in preventing adhesion of stains, comprising a base sheet and a layer formed on a surface of the base sheet, said layer comprising a mixture of a first silicone compound and a second silicone compound having a lower surface tension than the first silicone compound, said second silicone compound appearing on a surface of the layer in an amount which is greater than the first silicone compound by way of bleeding, comprising the steps of forming a coat of a mixture of the first silicone compound and the second silicone compound having a lower surface tension than the first silicone compound on the base sheet; and crosslinking the silicone compounds so that the second silicone compound appears on the surface of the coat more than the first silicone compound by bleeding.

16. The process as described in claim 15 wherein formation of the coat of the mixture of the first and the second silicone compounds is carried out by use of one of an air doctor coater, a blade coater, a rod coater, a knife coater, a squeeze coater, an impregnating coater, a reverse-roll coater, a transfer roller coater, a gravure coater, a kiss-roll coater, a cast coater, a spray coater, a curtain coater, a calendar coater, and an extrusion coater.

17. A sheet highly effective in preventing adhesion of stains, comprising:
a base sheet,
a first silicone compound layer formed on a surface of the base sheet, and
a second silicone compound layer formed on a surface of the first silicone compound layer, the second silicone compound having a lower surface tension than the first silicone compound;
wherein the first silicone compound is at least one compound selected from the group consisting of silicone polyester varnish, silicone phenol varnish, silicone melamine varnish, dimethylsilicone rubber, and methylphenylvinylsilicone rubber.

18. The sheet as described in claim 17 wherein a surface tension of the first silicone compound is 30.0 mN/m or less.

19. The sheet as described in claim 18 wherein the first silicone compound layer has a thickness of 0.1 μm or more.

20. The sheet as described in claim 18 wherein the second silicone compound layer has a thickness of 0.1 μm or more.

21. The sheet as described in claim 18 wherein the second silicone compound comprises at least one silicone oil selected from the group consisting of dimethylsilicone oil, methylphenylsilicone oil, methylhydrogensilicone oil, polydimethylsiloxanediol, alkyl-based silicone oil, aralkyl-based silicone oil, polyether-modified silicone oil, fluoroalkyl-modified silicone oil, aliphatic ester-modified silicone oil, amino-modified silicone oil, epoxy-modified silicone oil, carboxyl-modified silicone oil, methacryl-modified silicone oil, alcohol-modified silicone oil, mercapto-modified silicone oil, and vinyl-modified silicone oil.

22. The sheet as described in claim 18 wherein the base sheet comprises at least one compound selected from the group consisting of cellulose compounds, polyamide compounds, polyvinyl alcohol compounds, polyvinylidene chloride compounds, polyvinyl chloride compounds, polyester compounds, polyacrylonitrile compounds, polyethylene compounds, polypropylene compounds, polyurethane compounds, and polyalkylene p-oxybenzoate compounds.

23. A sheet highly effective in preventing adhesion of stains, comprising:
a base sheet,
a first silicone compound layer formed on a surface of the base sheet, and
a second silicone compound layer formed on a surface of the first silicone compound layer, the second silicone compound having a lower surface tension than the first silicone compound;
wherein the second silicone compound is mercapto-modified silicone oil as non-reactive silicone oil.

24. The sheet as described in claim 23 wherein a surface tension of the first silicone compound is 30.0 mN/m or less.

25. The sheet as described in claim 24 wherein the first silicone compound layer has a thickness of 0.1 μm or more.

26. The sheet as described in claim 24 wherein the second silicone compound layer has a thickness of 0.1 μm or more.

27. The sheet as described in claim 24 wherein the first silicone compound comprises at least one silicone oil selected from the group consisting of methylhydrogensilicone oil, polydimethylsiloxanediol, epoxy-modified silicone oil, carboxyl-modified silicone oil, methacryl-modified silicone oil, alcohol-modified silicone oil, mercapto-modified silicone oil, vinyl-modified silicone oil, and amino-modified silicone oil.

28. The sheet as described in claim 24 wherein the first silicone compound comprises at least one silicone oil selected from the group consisting of dimethylsilicone oil, methylphenylsilicone oil, alkyl-based silicone oil, aralkyl-based silicone oil, polyether-modified silicone oil, fluoroalkyl-modified silicone oil, and aliphatic ester-modified silicone oil.

29. The sheet as described in claim 24 wherein the first silicone compound comprises at least one compound selected from the group consisting of polysiloxane, silicone alkyd varnish, silicone epoxy varnish, silicone polyester varnish, silicone acryl varnish, silicone phenol varnish, silicone urethane varnish, silicone melamine varnish, dimethylsilicone rubber, methylvinylsilicone rubber, methylphenylvinylsilicone rubber, and methylfluoroalkylsilicone rubber.

30. The sheet as described in claim 24 wherein the base sheet comprises at least one compound selected from the group consisting of cellulose compounds, polyamide compounds, polyvinyl alcohol compounds, polyvinylidene chloride compounds, polyvinyl chloride compounds, polyester compounds, polyacrylonitrile compounds, polyethylene compounds, polypropylene compounds, polyurethane compounds, and polyalkylene p-oxybenzoate compounds.

31. A sheet highly effective in preventing adhesion of stains, comprising:
  a base sheet comprising at least one compound selected from the group consisting of cellulose compounds, polyamide compounds, polyvinyl alcohol compounds, polyvinylidene chloride compounds, polyvinyl chloride compounds, polyester compounds, polyacrylonitrile compounds, polyethylene compounds, polypropylene compounds, polyurethane compounds, and polyalkylene p-oxybenzoate compounds,
  a first silicone compound layer formed on a surface of the base sheet, and
  a second silicone compound layer formed on a surface of the first silicone compound layer, the second silicone compound having a lower surface tension than the first silicone compound;
  wherein the base sheet is in at least one of raincoats, bibs for babies and infants, aprons, lunch mats, tablecloths, underwear, and sanitary goods including a sanitary napkin that are one of a resin film, netting, nonwoven fabric and cloth.

32. The sheet as described in claim 31 wherein the sheet is used in the sanitary napkin for repelling blood.

33. The sheet as described in claim 32 wherein the surface tension of the first silicone compound is 30.0 mN/m or less.

34. The sheet as described in claim 33 wherein the first silicone compound layer has a thickness of 0.1 µm or more.

35. The sheet as described in claim 33 wherein the second silicone compound layer has a thickness of 0.1 µm or more.

36. The sheet as described in claim 33 wherein the first silicone compound comprises at least one reactive silicone oil selected from the group consisting of methylhydrogensilicone oil, polydimethylsiloxanediol, epoxy-modified silicone oil, carboxyl-modified silicone oil, methacryl-modified silicone oil, alcohol-modified silicone oil, mercapto-modified silicone oil, vinyl-modified silicone oil, and amino-modified silicone oil.

37. The sheet as described in claim 33 wherein the first silicone compound comprises at least one silicone oil selected from the group consisting of dimethylsilicone oil, methylphenylsilicone oil, alkyl-based silicone oil, aralkyl-based silicone oil, polyether-modified silicone oil, fluoroalkyl-modified silicone oil, and aliphatic ester-modified silicone oil.

38. The sheet as described in claim 33 wherein the first silicone compound comprises at least one compound selected from the group consisting of polysiloxane, silicone alkyd varnish, silicone epoxy varnish, silicone polyester varnish, silicone acryl varnish, silicone phenol varnish, silicone urethane varnish, silicone melamine varnish, dimethylsilicone rubber, methylvinylsilicone rubber, methylphenylvinylsilicone rubber, and methylfluoroalkylsilicone rubber.

39. The sheet as described in claim 33 wherein the second silicone compound comprises at least one silicone oil selected from the group consisting of dimethylsilicone oil, methylphenylsilicone oil, methylhydrogensilicone oil, polydimethylsiloxanediol, alkyl-based silicone oil, arakyl-based silicone oil, polyether-modified silicone oil, fluoroalkyl-modified silicone oil, aliphatic ester-modified silicone oil, amino-modified silicone oil, epoxy-modified silicone oil, carboxyl-modified silicone oil, methacryl-modified silicone oil, alcohol-modified silicone oil, mercapto-modified silicone oil, and vinyl-modified silicone oil.

\* \* \* \* \*